No. 707,584. Patented Aug. 26, 1902.
D. GREENWALT & J. B. DAWSON.
DRILL SHAPER.
(Application filed Nov. 11, 1901.)
(No Model.) 2 Sheets—Sheet 1.
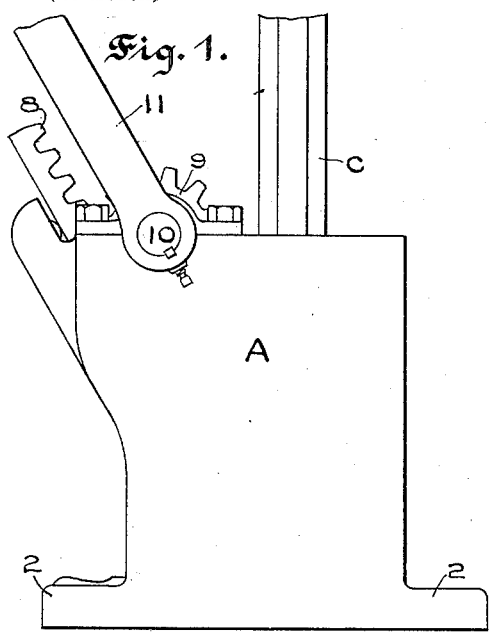
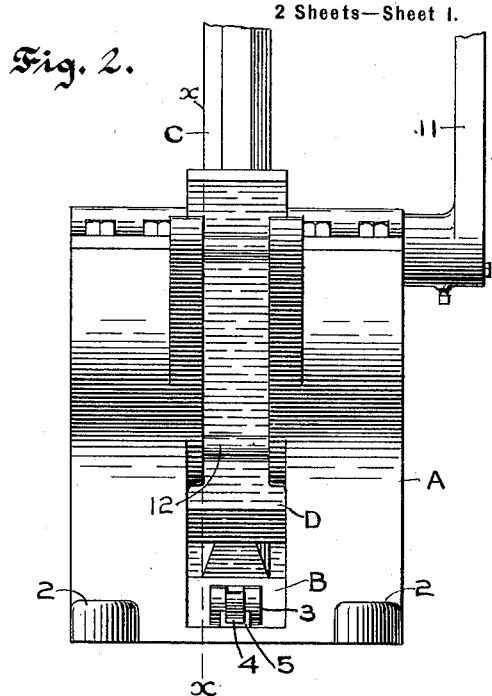
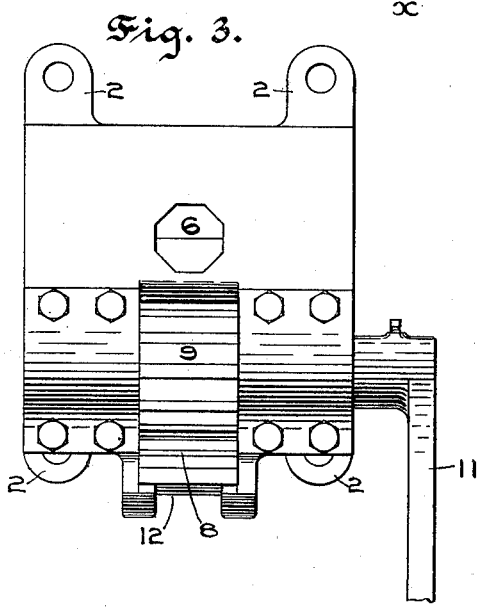
Witnesses,
W. H. Palmer
Emily Eastman
Inventors,
Dan Greenwalt,
James B. Dawson.
by Lothrop & Johnson
their Attorneys.

No. 707,584. Patented Aug. 26, 1902.
D. GREENWALT & J. B. DAWSON.
DRILL SHAPER.
(Application filed Nov. 11, 1901.)
(No Model.) 2 Sheets—Sheet 2.
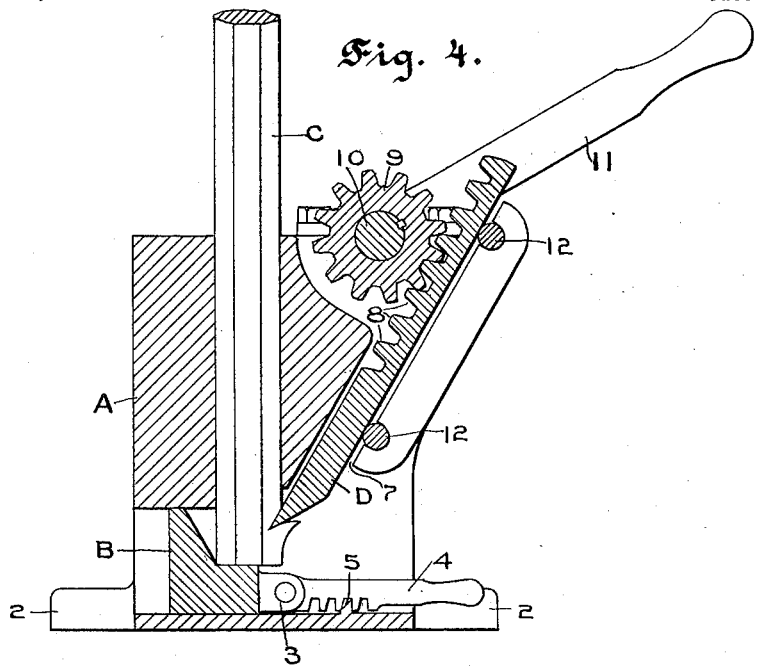
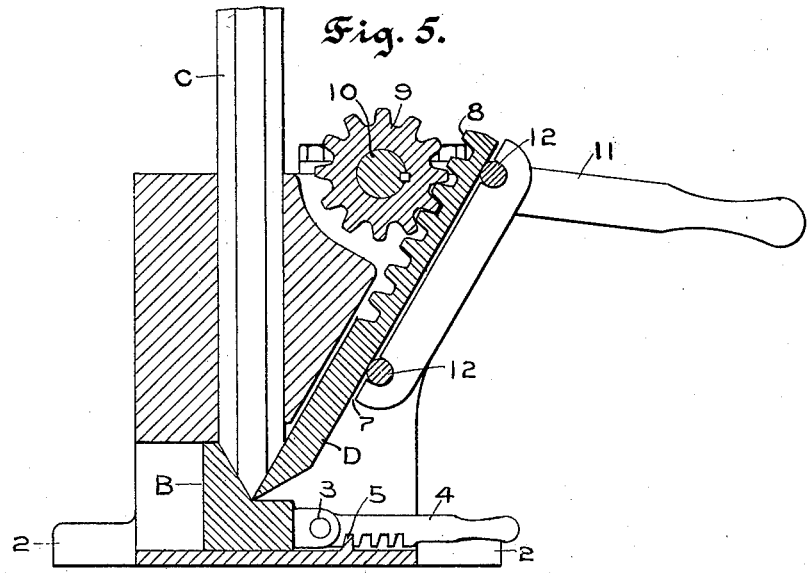

UNITED STATES PATENT OFFICE.

DAN GREENWALT AND JAMES B. DAWSON, OF BRECKENRIDGE, COLORADO.

DRILL-SHAPER.

SPECIFICATION forming part of Letters Patent No. 707,584, dated August 26, 1902.

Application filed November 11, 1901. Serial No. 81,835. (No model.)

*To all whom it may concern:*

Be it known that we, DAN GREENWALT and JAMES B. DAWSON, citizens of the United States, residing at Breckenridge, in the county of Summit and State of Colorado, have invented certain new and useful Improvements in Drill-Shapers, of which the following is a specification.

Our invention relates to improvements in drill-shapers, its object being to provide a device for cutting the bit ends of dull or broken drills to put the same in serviceable condition.

To this end our invention consists in the features of construction and combination hereinafter particularly described and claimed.

In the accompanying drawings, forming part of this specification, Figure 1 is a side elevation of our improved device. Fig. 2 is a front elevation of the same. Fig. 3 is a top view. Fig. 4 is a section on line $x\,x$ of Fig. 2, showing one side of the bit end of the drill being tapered; and Fig. 5 is a similar view showing the opposite side tapered.

In the drawings, A represents the frame of the machine, provided with lugs 2, by means of which it may be secured to any suitable support. Slidable in a transverse opening in the bottom of the casing is a bed-plate B, shown connected by a hinge 3 with a toothed arm 4, which works in connection with a lug 5, projecting upwardly from the bottom of the machine. The upper forward corner of the bed-plate is cut away to receive the end of the drill, as shown in Figs. 4 and 5.

Extending through the frame of the machine is a vertical opening 6, into which is adapted to be placed the drill C.

D represents a knife slidable in an opening 7 at an angle with the drill-opening 6. The knife is shown formed upon its outer face with teeth 8, with which intermesh the teeth of a pinion 9, secured upon a shaft 10, said shaft having journal-bearing in the sides of the machine and being provided with an actuating-lever 11.

12 represents roller-bearings for the knife.

The dull or broken drill is first heated to the desired degree and then placed in the opening 6. The knife then being actuated by the lever 11, as shown in Fig. 4, will shear off one side of the bit end of the drill. The drill is then withdrawn and reinserted in the opening with its opposite side toward the knife, the bed-plate being brought forward, as shown in Fig. 5, to fit closely against the bit end of the drill. The knife being then actuated by the lever 11 will shear off the opposite side of the drill, thus putting the same in serviceable condition.

It will be evident that our invention may be more or less modified without departing from the essential features of invention, and it may be used as an independent machine or as an attachment for other devices.

We claim—

1. In a machine of the class described, the combination of suitable framework provided with a vertical drill-opening arranged to admit a drill from the top thereof, a bed-plate at the bottom of said opening, a knife arranged at an angle with said opening, and means for actuating said knife.

2. In a machine of the class described, the combination with suitable framework provided with a vertical drill-opening arranged to admit a drill from the top thereof, a knife slidably supported at an angle therewith, and provided with a rack, roller-bearings supporting said knife, a pinion intermeshing with said rack, and an actuating-handle for said pinion.

3. In a machine of the class described, the combination of suitable framework provided with a vertical drill-opening, and a horizontal opening at the lower end of said vertical opening, a bed-plate slidable in said horizontal opening, a lug arranged in said opening, an arm hinged to said bed-plate and having notches interlocking with said lug, a knife slidable at an angle with said drill-opening, and means for actuating said knife.

4. The combination in a drill-shaper in which a drill is held in vertical position, a horizontally-slidable bed-plate provided with an inclined abutting wall for the bit end of the drill, means for holding said bed-plate in adjusted position, an upwardly-inclined knife provided with a rack, roller-bearings for said knife, a pinion engaging with the rack-teeth upon said knife, and an actuating-lever for said pinion.

5. The combination in a drill-shaper in which a drill is held in upright position, an adjustable bed-plate provided with an inclined abutting wall for the bit end of said drill, a knife, and means for moving said knife toward and from said bed-plate.

In testimony whereof we affix our signatures in presence of two witnesses.

DAN GREENWALT.
JAMES B. DAWSON.

Witnesses:
W. T. TRONNAN,
JAS. K. DARNELL.